United States Patent [19]

Hafele

[11] 4,432,719
[45] Feb. 21, 1984

[54] APPARATUS FOR FORMING A BLOWN THERMOPLASTIC ARTICLE

[75] Inventor: Robert X. Hafele, Baton Rouge, La.

[73] Assignee: Hoover Universal Inc., Ann Arbor, Mich.

[21] Appl. No.: 348,205

[22] Filed: Feb. 12, 1982

Related U.S. Application Data

[62] Division of Ser. No. 97,230, Nov. 26, 1979, Pat. No. 4,315,888.

[51] Int. Cl.³ ............................................. B29C 17/07
[52] U.S. Cl. .................................. 425/526; 425/530; 425/532
[58] Field of Search ............... 425/522, 525, 526, 530, 425/532; 264/503, 523, 526, 529, 530, 531, 532, 533, 540, 542, 543, 312

[56] References Cited

U.S. PATENT DOCUMENTS

| | | |
|---|---|---|
| Re. 29,045 | 11/1976 | Uhlig . |
| 3,288,898 | 11/1966 | West . |
| 3,307,726 | 3/1967 | Cleereman . |
| 3,375,553 | 4/1968 | Criss .................... 264/523 X |
| 3,488,804 | 1/1970 | Butcher . |
| 3,754,851 | 8/1973 | Reilly et al. . |
| 3,767,747 | 10/1973 | Uhlig . |
| 3,806,300 | 4/1974 | Hafele et al. . |
| 3,940,225 | 2/1976 | Uhlig . |
| 3,941,542 | 3/1976 | Uhlig . |
| 3,949,033 | 4/1976 | Uhlig . |
| 3,995,763 | 12/1976 | Ayres et al. . |
| 4,004,872 | 1/1977 | Krall et al. . |
| 4,049,761 | 9/1977 | Lorgé et al. . |
| 4,115,494 | 9/1978 | Valyi . |
| 4,122,138 | 10/1978 | Cleereman et al. . |
| 4,147,748 | 4/1979 | Saumsiegle . |

*Primary Examiner*—Jan H. Silbaugh
*Attorney, Agent, or Firm*—Arnold, White & Durkee

[57] ABSTRACT

A method and apparatus are disclosed for forming blown thermoplastic articles in which an extrusion head extrudes an essentially tubular parison of thermoplastic material. Sections of a preform mold are then closed around the parison, the sections having a preform cavity with a configuration such that one end of the parison is open after closing and the other end is enclosed. A core pin is next inserted into the open end of the parison and is utilized to compression mold the parison to form a preform. Heat is transferred from the parison through the inner and outer walls of the preform between the mold cavity and core pin during the compression molding step in order to thermally condition the preform and bring the temperature within the desired range. The sections of the preform mold are then opened and the preform is enclosed within sections of blow molds within a blow mold cavity. The preform is next expanded to the shape of the blow mold cavity. This process may be continuously repeated by means of multifunction mold halves.

3 Claims, 7 Drawing Figures

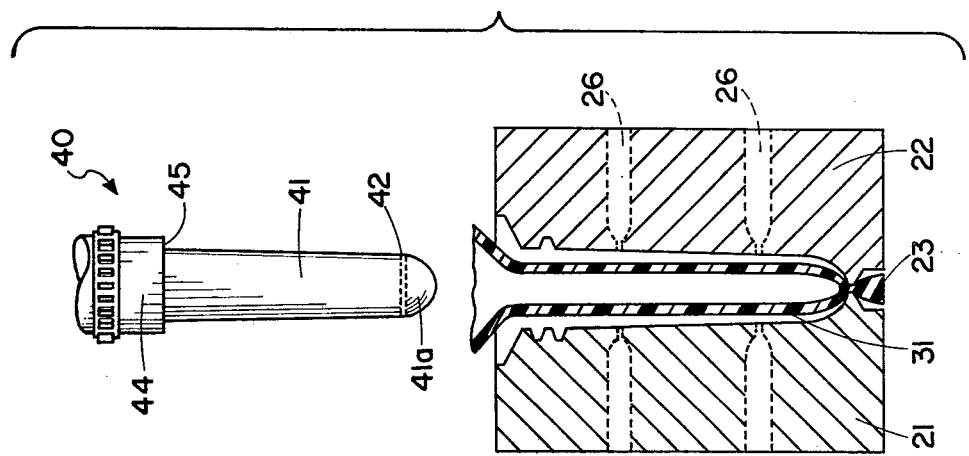
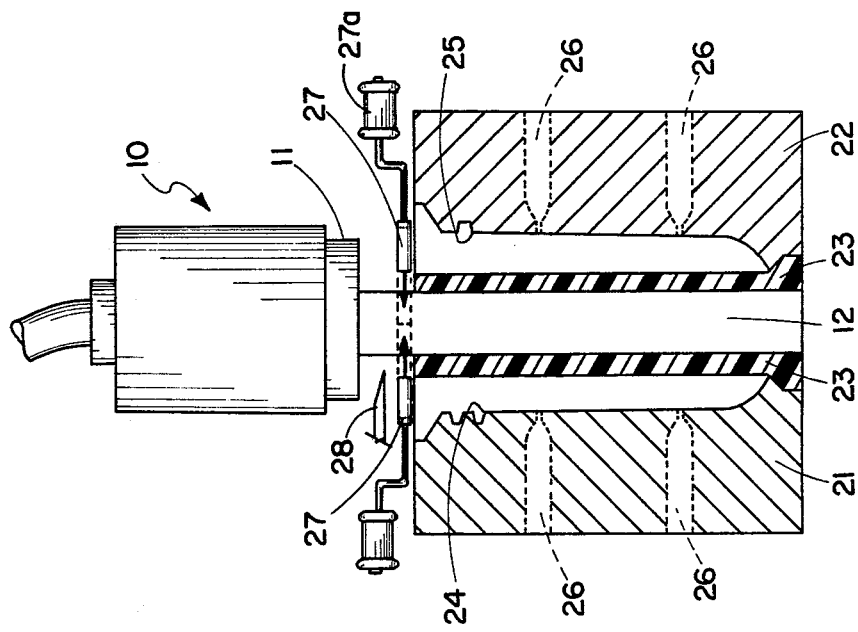
FIG. 1
FIG. 2

APPARATUS FOR FORMING A BLOWN THERMOPLASTIC ARTICLE

This is a division of application Ser. No. 97,230, filed Nov. 26, 1979 now U.S. Pat. No. 4,315,888.

BACKGROUND OF THE INVENTION

This invention relates generally to a method and apparatus for forming blown thermoplastic articles, and more particularly to a method and apparatus which compression molds an extruded parison into a preform and then expands the preform into a blown article.

Various methods for forming blown thermoplastic articles are known in the prior art. Examples of such methods are disclosed by U.S. Pat. Nos. 3,940,225, Re. 29,045, 3,754,851, 3,941,542, 4,004,872, 4,049,761, 4,115,494, 3,307,726, 3,356,242, and 3,288,898.

In general, one of the methods for forming a blown article includes injection molding a parison and then blowing that parison into the completed article. By this method, the temperature and shape of the parison can be fairly accurately regulated. However, the injection molds themselves and the high-pressure hydraulic equipment required to develop high pressures during the injection process are quite expensive. The present invention achieves an accurately formed preform shape at a desired temperature without requiring the expensive molds and tooling required by an injection molding process.

In other methods, such as shown by U.S. Pat. Nos. 3,940,225, Re. 28,045, and 3,941,542, an extruded parison is blown into a preform shape, which is then blown into the shape of the final article. The initial preform blowing step conditions the preform to a temperature which is conducive to molecular orientation during the final blowing operation. However, the initial blowing step is apparently done at a temperature which is not conducive to molecular orientation, and therefore the final blowing operation does not take advantage of all the molecular orientation which might be achieved from stretching a preform from a parison shape to the shape of the final article. The present invention compression molds the extruded parison into a preform shape having a diameter essentially the same as the extruded parison, such that the final blowing step is performed while the material is at a temperature conducive to molecular orientation. This expansion step, therefore, lends itself to achieving greater degrees of molecular orientation over the processes of the blow-and-blow operations. Moreover, in the present invention, the preform is cooled both on its interior and exterior surfaces while in contact with the mold walls and the core pin.

Further, in extrusion-blow operations, the thickness of the parison is governed by the final article. For example, when an article having a rectangular cross-section such as a milk jug is blown, the minimum thickness of the blown article is at the corners of the rectangular shape. The sections of the final article between the corners are usually unnecessarily thick, thereby using more material. The present invention enables the formation of irregular shaped preforms, such as rectangular in cross-section, to match the shape of the article to be formed by blow molding.

SUMMARY OF THE INVENTION

The present invention overcomes the prior shortcomings through a method for forming a blown thermoplastic article which includes the steps of extruding essentially tubular parisons of thermoplastic material or other extrudable resins. Sections of a preform mold are then closed around a parison, the preform mold having a configuration and position such that upon closure one end of the parison remains open and the other end of the parison is closed and the parison is enclosed within the preform cavity. A core pin is then inserted into the open end of the parison and the parison is compression molded to form a preform. During this compression molding phase, heat is transferred through both the inner and outer walls of the preform between the core pin and the mold cavity respectively to thermally condition the preform and to bring the temperature of the preform to within a desired range. The sections of the preform mold are then opened. Sections of a blow mold are then closed around the thermally conditioned preform, thereby enclosing the preform within a blow mold cavity. The preform is then expanded into the shape of a blow mold cavity.

In a more preferred aspect of the present method, the preform may be cooled to a temperature such that the preform will be at a temperature conductive to molecular orientation during the expanding of the preform within the blow mold cavity.

In another aspect of the present method, the insertion of the core pin into the parison may be facilitated by forcing air into the interior of the parison through an opening provided in the core pin during at least a portion of the time of insertion of the core pin into the parison. The insertion of the core pin may alternatively be facilitated by applying a vacuum to the exterior of the parison after closing the sections of the preform mold.

The lower end of the parison may be pinched shut by the closing of the preform mold sections in order to form a closed bottom for the preform. The preform mold may also include a bottom section for forming the base of the preform and have a cavity which extends entirely through the upper sections of the preform whereby the closing of the lower end of the parison is characterized by leaving both ends of the parison open during the closure of the upper mold sections and compressing thermoplastic material of the parison against the bottom mold section to form the closed end of the preform. This process may be further characterized by rotating the bottom mold section to enhance the formation of the closed end of the preform.

In an alternative aspect of the present method, the lower end of the parison may be pinched shut by a pair of pinching members which close onto the parison along an axis which is perpendicular to the axis along which the preform mold sections are closed. As the preform molds are closed, the bottom of the parison is severed by surfaces on the preform mold sections.

In another aspect of the present method, the expansion of the preform within the blow mold cavity may be characterized by inserting a stretch rod into the preform and against the interior bottom of the preform. The stretch rod then stretches the preform along its axis, subsequent to which blow air is introduced under pressure into the stretch preform. Alternatively, the stretch rod may be simultaneously inserted to stretch the parison axially with the introduction of blow air to stretch the parison radially under pressure in order to achieve biaxial orientation.

In another aspect of the present method, the mold sections may be closed around the parison at a first position and then transferred to a second position for the insertion of the core pin. The preform may then be retained on the core pin during the opening of the sections of the preform mold and the blow mold sections may be transported to the second station for the closing of the sections of the blow mold around the core pin and preform. The blow mold sections then remain at the second station and the core pin is retracted from the preform. The blow mold sections are then transferred to a third station where the expansion of the preform to the shape of the blow mold cavity.

In the most preferred aspect of the present method, thermoplastic articles are successively blown utilizing the steps of downwardly extruding successive parisons of essentially thermoplastic material at a first station. The sections of a preform mold are then closed upon the parison at the first station, pinching shut one end of the parison, leaving the other end of the parison open and enclosing the parison within a preform mold cavity. At the same time, sections of a blow mold are closed around a previously formed thermoplastic preform supported on a core pin at a second station. The core pin is then retracted leaving the previously formed preform within the mold cavity. The closed sections of the preform mold with the enclosed parison are then transferred to the second station while the closed sections of the blow mold are transferred with the previously formed preform to a third station. The core pin is then inserted into the parison of the first preform mold at the second station to compression mold the parison into a preform and to reduce the temperature of the preform by heat transfer from the preform to both the core pin and the preform mold sections while at about the same time the previously formed preform is expanded interiorly of the blow mold at the third station. The sections of the preform mold are then opened after a predetermined length of time adequate for reduction of the temperature of the preform to a desired temperature range, leaving the preform on the core pin at the second station. The sections of the blow mold are also opened after sufficient amount of time to enable the blown thermoplastic article to cool and the two opened sections are transferred from the second and third stations to the first and second stations respectively. This process is repeated in a continuous operational manner to form successfully blown articles.

The instant invention also provides an apparatus for forming a blown thermoplastic article from an extruded parison. The apparatus includes a preform mold for closing around the parison, with the mold having a preform cavity which includes an opening at one end for leaving at least one end of the parison open. The preform mold should also be comprised of a material adequate to absorb heat from the parison.

The apparatus also includes a core pin for insertion into the open end of the preform mold for compression molding the parison to form a preform and for transferring heat through the inner wall of the preform to thermally condition the preform to a desired temperature range. The apparatus further comprises a blow mold for closing around the preform and a means for expanding the preform once it is thermally conditioned.

In a narrower aspect of the present invention, the core pin includes a port for forcing air into the interior of the parison as the core pin is inserted into the parison.

In an alternative aspect of the preferred embodiment of the present invention, the preform mold may include a bottom section for forming a base on the preform. The bottom mold section may further include means for rotating the section to enhance the formation of the closed end of the base of the preform.

In a more preferred embodiment of the present invention, the core pin includes a means for rotating the core pin after it has been fully inserted into the preform mold in order to achieve laminar orientation of the thermoplastic material.

In another alternative embodiment of the present invention the apparatus may further include a pair of pinching members which close onto the parison along an axis that is perpendicular to the axis along which the preform mold sections are closed in order to pinch shut the lower end of the parison.

In the most preferred embodiment of the present invention, the apparatus includes first and second preform mold sections and first and second blow mold sections. An axially movable core pin and a means for expanding the preforms are included for each preform mold and blow mold such that the first preform mold and the second preform mold alternatively close upon a parison in a continuous operation.

Accordingly, the present invention overcomes the previously discussed shortcomings through an apparatus and method which provides for faster cycle time for an extruded blow molded article. The apparatus and method also reduce the cost of production due to the achievement of an accurately formed preform for an extrusion molding process, a process which is much less expensive than injection molding. The method further provides a means to achieve a desired shape and wall thickness for a preform and subsequently for a blow molded article, even for irregular shapes if desired. The compression molding of the preform within a preform mold cavity additionally enables improved temperature regulation for the preform to enhance the formation of the preform and to possibly lend to greater degrees of molecular orientation. In turn, this process is particularly adaptable to polyvinylchloride, polypropylene, polyethylene terephthalate, and other extrudable resins.

BRIEF DESCRIPTION OF THE DRAWINGS

This invention will further be illustrated by reference to the appended drawings which illustrate particular embodiments of the device for blow molding thermoplastic articles in accordance with this invention.

FIGS. 1-4 are schematic views of the operational steps in a first embodiment of the present invention.

DESCRIPTION OF THE PREFERRED EMBODIMENT

Figure 4:
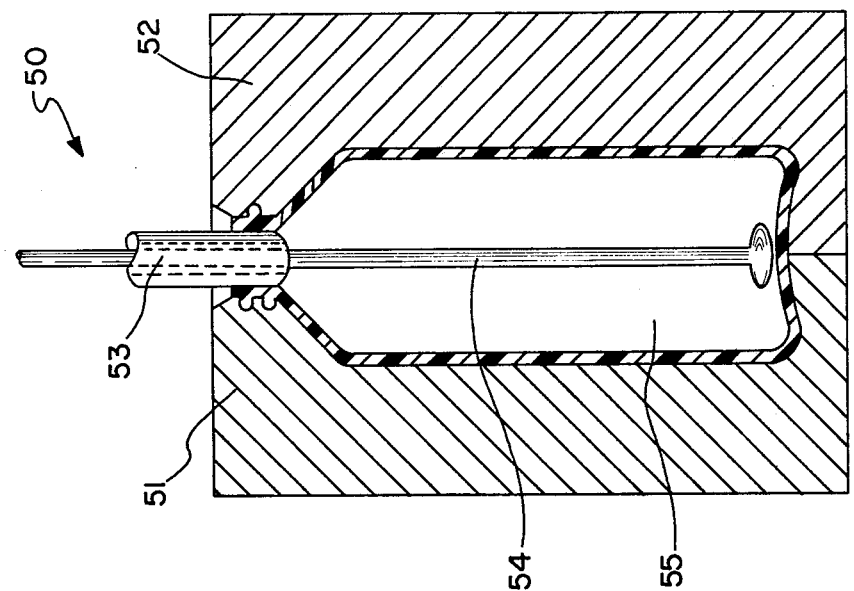

The preferred embodiment is generally represented by an extrusion system 10, a preform mold system 20, a core pin system 40 and a blow mold system 50.

Referring to FIG. 1, the extrusion system 10 comprises any of a suitable number of extrusion machines (not shown) which melt thermoplastic material preparatory to extrusion and then extrude it through a suitable extrusion head 11 in tubular form. The extrusion head 11 may, in turn, extrude material through more than one outlet thereby accommodating the continuous multiple output of extruded tubular material in the form of a plurality of parisons 12.

The preform mold system 20 comprises mold sections 21 and 22, having lower closure sections 23. The mold sections 21 and 22 may comprise opposing mold halves, with each half having a vertical tubular recess extending partially therethrough such that the lower end of the recess forms a lower closure 23 integrally with the mold sections upon the closing of the opposing mold halves 21 and 22. This closure 23 cuts and pinches shut the parison 12 at the lower end of the parison. In turn, the closing of the opposing mold forms a preformed cavity 31 for formation of the parison into a preform. The mold sections 21 and 22 may further have threaded recesses 24 and 25 for forming a finish on the neck of the parison once it is formed into a preform.

In order to facilitate the formation of a preform within the mold cavity, the sections 21 and 22 may further include optional vacuum apertures 26 to draw the parison against the mold cavity to accommodate the insertion of the core pin, as later explained. Optional grippers 27 may also be included to hold the parison 12 while the mold sections are closing upon it in order to prevent parison from sagging down into the bottom of the mold sections 21 and 22. The grippers may be radially movable by a suitable power means, if desired, such as the schematically illustrated pneumatic cylinder 27A. In addition, a knife 28 may be included either with the mold sections 21 and 22 or with the extrusion system 10, the knife 28 being used to cut the parison when it reaches the desired length.

The preform mold system 20 should further comprise suitable actuating mechanisms (not shown) such as hydraulic piston and cylinder devices, to open and close the mold sections 21 and 22 and to move the knife 28. The mold system 20 may further include any of a number of suitable tail pullers (not shown) for removing excess material at the lower end of the parison, such as are currently available and known to those of ordinary skill in the art.

Mold sections 21 and 22 should also preferably include internal ducts (not shown) to accommodate the circulation of a temperature regulating fluid. Such ducts may be of any conventional design known in the art. The temperature regulating effect achieved by the molds will work in conjunction with the temperature regulating effect of the core pin, as described later, in order to quickly reduce the parison temperature and to achieve the temperature desired. That temperature will preferably be one such that the final blow molding step will achieve molecular orientation.

Figure 3:
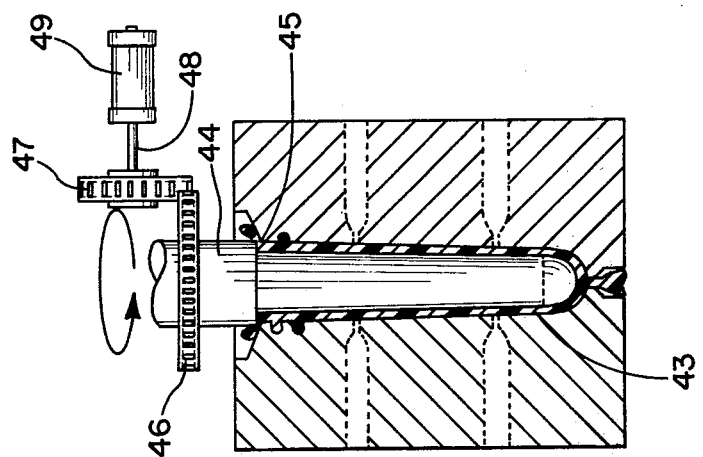

As shown in FIGS. 2 and 3, the core pin system 40 comprises a core pin 41 secured to a suitable actuating mechanism (not shown) such as a hydraulic piston and cylinder device to provide linear movement of the core pin 41 into and out of the preform cavity formed by the closed mold sections 21 and 22. The core pin 41 has a configuration substantially similar to the mold cavity and has slightly smaller dimensions, such that the insertion of the core pin 41 into the cavity compresses the parison 12 to form the preform 43 within the cavity. The mold cavity and core pin 41 may be matched so that the preform wall thickness varies to any thickness desired.

The core pin 41 may optionally have a movable end section 41A, as shown in phantom to its moved position in FIG. 2, to open an air vent 42 to accommodate air being forced through the core pin into the parison. Opening the air vent will preferably occur as the core pin 41 is being initially inserted into the parison. The air under pressure serves to force the thermoplastic material against the mold cavity walls to facilitate the insertion of the core pin. At a predetermined time during the core pin insertion, the end section 41A may be retracted to close the air vent, so that the application of air under pressure will be discontinued. This will prevent plastic from entering the air vent. Alternatively, the end section may remain open, but the air under pressure might be discontinued such that vent 42 is vented to atmosphere at a predetermined time to relieve pressure inside the cavity during the final phases of the core pin insertion.

The core pin should preferably taper towards its end to facilitate the insertion of the core pin.

The core pin 41 will preferably include heat transfer means, such as cooling ducts (not shown) whereby the pin may act to cool the preform 43 to a predesired temperature. In this manner, the parison 12 or preform 43 may transfer heat through its inner wall through the core pin and through its outer wall through the mold sections 21 and 22.

The core pin may also preferably include an upper flange 44. This flange serves to sever the excess plastic material at the top of the parison, as shown in FIG. 3. Additionally, the lower surface 45 of the flange compresses plastic material interiorly of the cavity to compression form the preform 43, including forming a finish on the preform. The bottom surface 45 may be either sized to fit into the cavity 31 or alternatively to engage an edge on the top of the mold halves around the opening to the cavity. Sizing the flange 44 such that it will fit into the cavity may be preferable in order to compress excess plastic into the cavity and thereby eliminate trimming. As shown in FIG. 3, the flange 44 might optionally include a gear arrangement 46 on the core pin meshing with another gear 47 that is interconnected with a motor. This arrangement will rotate the core pin after it is fully inserted into the preform molded cavity, to achieve a laminar orientation of the material, if desired. Of course, other alternative structures may be provided in place of the gear and motor, which are merely exemplary.

As shown in FIG. 4, the blow mold system 50 includes blow mold sections 51 and 52 having opposing recesses such that the closing of the blow mold sections 51 and 52 forms a mold cavity 55 having a desired configuration. The blow mold system 50 further includes a blow pin 53 for injecting compressed air into a preform. The blow mold system 50 may further include actuating means (not shown) such as a piston and cylinder mechanism or other suitable mechanisms for opening and closing the mold sections 51 and 52 and for moving the mold sections 51 and 52 into place. A blow pin motivator (not shown) such as a cylinder and piston may also be included to insert and remove the blow pin 53 as needed.

The blow pin 53 is comprised of any of a number of suitable blow pins currently available for utilization in blow molding thermoplastic articles. The pin 53 may include an optional stretch rod 54, to guide the bottom center of the preform 43 to the bottom center of the blow mold cavity 55 as air enters the preform and blows it to conform with the shape of a closed blow mold sections. The stretch rod may also serve to stretch the preform to achieve biaxial orientation. Insertion of the stretch rod for that stretching operation may either be simultaneously with or precede the injection of blow air under pressure. Accordingly, when the apparatus in the embodiment of FIGS. 1–4 is utilized, an essentially tubular parison 12 of thermoplastic material is extruded from the extrusion head 11. The preform mold sections 21 and 22 are then closed around the parison 12, thereby leaving the upper end of the parison open and enclosing the parison within the preform cavity 31 formed by the recesses in the mold sections 21 and 22. The parison 12 may further be gripped by grippers 27 during the closing of the preform molds 21 and 22 in order to prevent the sagging of the parison 12 into the preform mold cavity 31 and in order to hold the parison 12 stationary while the knife 28 cuts the parison 12.

Next, the preform mold may either be moved, or the extrusion head may be moved, in order to accommodate the compression molded within the preform cavity 31 to form a preform 43. During the compression molding of the preform 43, heat is transferred through both the inner and outer walls of the preform 43 through the mold sections 21 and 22 and through the core pin 41 to thermally condition the preform 43 to a temperature within a desired range. The sections of the preform mold 21 and 22 are then opened and the preform is placed within the blow mold sections 51 and 52 preparatory to blow molding, thereby enclosing the preform 43 within the blow mold cavity 55. The preform is next expanded by compressed air to the shape of a blow mold cavity.

The preform may be placed in a blow mold in a variety of ways. For example, the preform may be transported on the core pin to the blow mold. The core pin can also be used as the means for supplying blow air. However, if another blow pin is to be used, the core pin may be retracted from the preform before or after the preform is placed in the blow mold.

The insertion of the core pin 41 into the parison 12 may be facilitated in accordance with the present invention by forcing air into the interior of the parison 12 through the air vent 42 as the core pin 41 is inserted into the parison. Alternatively, a vacuum may be applied to the exterior of the parison 12 through the vent holes 26 after closing the mold sections 21 and 22 in order to draw the parison 12 to the sides of the preform mold cavity 31. Either or both of these features may be eliminated if unnecessary. For example, extrusion machines typically introduce air into the interior of the parison during extrusion to prevent the collapse of the parison. An internal pressure created by that air might be regulated to assure that the parison material is placed against the preform mold walls for insertion of the core pin.

Figure 5:
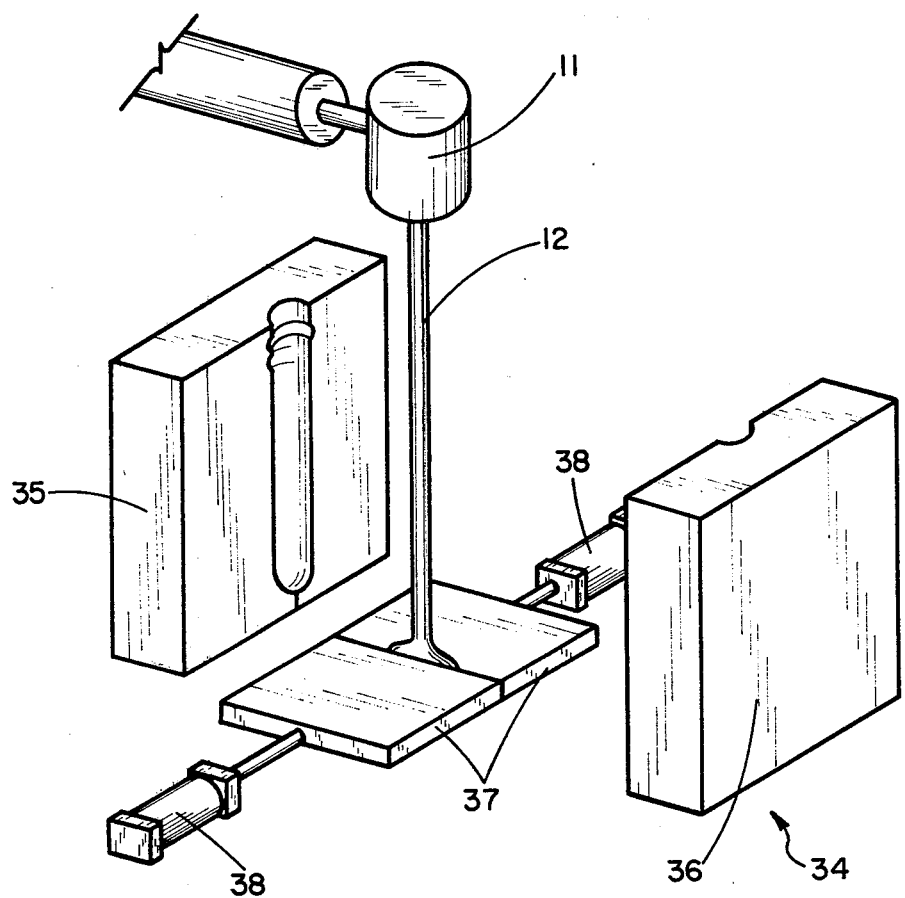
FIG. 5 is a schematic view of an alternative embodiment for the first step of FIG. 1.
Figure 6:
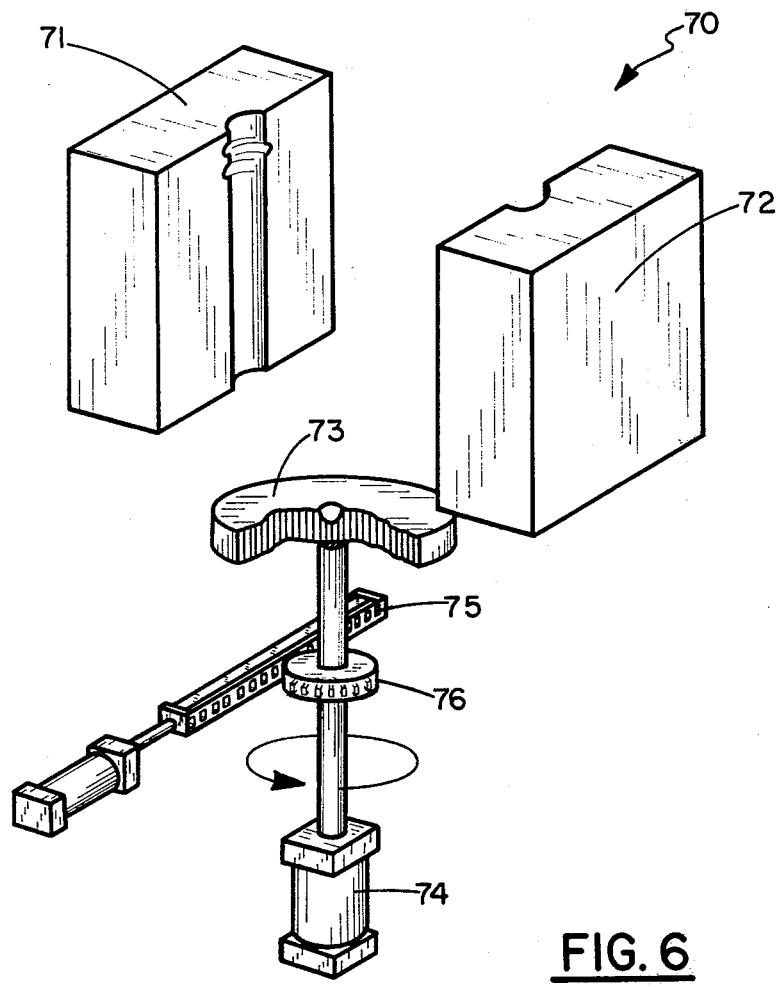
FIG. 6 is a schematic view of an alternative embodiment of the first step of FIG. 1 with a cut-away illustrating the recessed portion in the bottom mold section.

FIGS. 5 and 6 show alternative embodiments of the preform mold system 20. FIG. 5 shows a preform mold 34 comprising mold sections 35 and 36. The mold sections 35 and 36 have recesses and lower closure surfaces similar to those shown in FIG. 1 such that they form a similar mold cavity upon closure. The preform mold 34 further comprises opposing pinchers 37 for closing the lower end of the parison 12. In the preferred embodiment, the pinchers are comprised of flat metal blocks having mating edges such that the parison is pinched shut upon closure of the pinchers. The pinchers are positioned directly below and adjacent to the mold sections 34, and comprise a pair of respective actuating means 38 to selectively open and close the pinching members. These actuating members 38 may be piston and cylinder mechanisms as shown for the preferred embodiment or any other suitable mechanism for providing the linear motion necessary to open and close the pinchers. Pinching members 37 are preferably positioned such that they move along an axis that is perpendicular to the axis along which the preform mold sections are closed. This arrangement will help assure that any flattening of the parison will be generally along the plane including the axis of closing of the preform molds, so that the parison will be aligned for enclosure within the preform mold cavity to avoid flash. Additionally, the closure portion at the bottom of the mold, as discussed in connection with reference numeral 23 in FIG. 1, will cleanly sever the parison as the mold sections close, since the mold section 35, 36 and the pinching member 37 will preferably be in engagement.

Accordingly, when the apparatus of FIG. 5 is utilized, the pinching member 37 is closed upon the parison 12 and then the mold sections 35 and 36 are closed upon the parison in order to pinch one end of the parison 12 shut. The parison may then be prepared in a manner similar to that described for FIGS. 2–4.

FIG. 6 illustrates another embodiment for a preform mold system. In this embodiment, the preform mold comprises opposing preform mold sections 71 and 72 having semi-tubular recesses which extend the length of the mold sections such that the closure of the mold sections 71 and 72 form a tubular cavity open at both ends. The preform mold 70 further comprises a bottom mold section 73 which may be vertically moved into contact with the mold sections 71 and 72 by an actuating member 74, such as a piston and cylinder.

Means to rotate the bottom mold section 73 may further be included. These means may include a rotary gear (not shown) or a rack 75 and pinion 76, shown in phantom.

Accordingly, when the device of FIG. 6 is utilized, the bottom mold section 73 is moved upwardly in line with the downward movement of the parison 12 thereby collecting thermoplastic material on the bottom mold section 73. The collected thermoplastic material is then used to form a closed end on the base of the preform when the core pin is inserted. The formation of the closed end of the parison may further be enhanced by rotating the bottom mold section 73 after insertion of the core pin. The parison may then be formed in the same manner as described for FIGS. 2–4.

Figure 7:
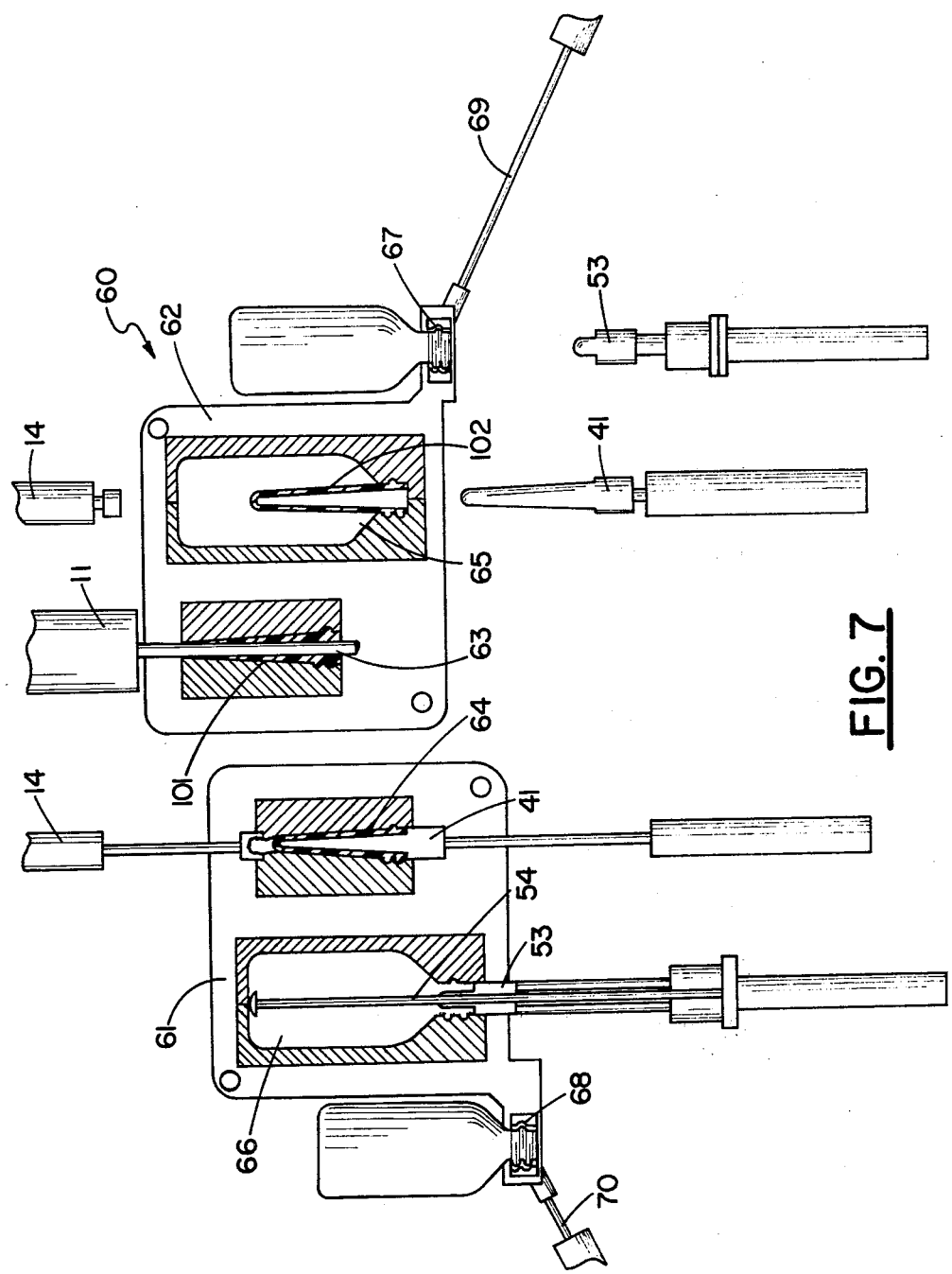
FIG. 7 is a schematic view of an alternative embodiment of the blow molding process and apparatus in accordance with the present invention.

FIG. 7 illustrates an alternative embodiment which integrates the systems illustrated in FIGS. 1–4 for a continous operation. In this embodiment, the mold cavities are inverted such that the larger end of the cavity is at the bottom. This arrangement may be preferred, since extruded parison sometimes expand at their bottom or tend to wander. If either of these events occur, having the larger end of the preform cavity at the bottom may enable the parison to be fully enclosed in the cavity to avoid flash.

In particular, the integrated system 60 is comprised of a pair of respective mold halves 61 and 62, only one section of each mold set being shown for purposes of clarity. The mold halves 61 and 62 each have a respective preform section 63 and 64 such that the mold forms a preform cavity similar to the cavity shown in FIG. 1 upon closure. In this embodiment of the present invention, however, the preform cavity enlarges downwardly to take advantage of the natural swelling tendency exhibited by parisons when extruded, and to accommodate the insertion of a core pin into the enlarged parison end.

The integrated mold halves 61 and 62 each further comprise a respective blow mold section 65 and 66 such that the closing of the mold halves 61 and 62 form a blow mold cavity similar to the cavity formed by the mold sections 51 and 52 illustrated in FIG. 1.

Additionally, the blow mold halves 61 and 62 may each further comprise respective finished article neck cavities 67 and 68 for the gripping of the finished article from the blow pin 53 once it is sufficiently cooled.

As shown in FIG. 7, the integrated system 60 may further comprise a pair of tail pullers 14 for removing any excess parison cut off by the closure of the preform mold recesses 63 and 64. A pair of actuating mechanism 69 and 70 are also provided for accommodating interstation movement of the mold halves 61 and 62 for subsequent steps. In the preferred embodiment, the actuating mechanisms are comprised of piston and cylinder members diagonally mounted to provide diagonal movement of the mold halves 61 and 62 in relation to a core pin system 40 and the blow pin system 50 identical in nature to that described for FIGS. 2-4. It should be understood by those with skill in the art, however, that other actuating mechanism may be used to provide interstation movement of the mold halves.

Accordingly, when the integrated system is utilized in accordance with the present invention, two or more sets of mold halves are utilized for each extrusion head. For simplicity of explanation, two sets of mold halves have been illustrated in FIG. 7 together with two sets of core pins and two sets of blow pins. For clarity, the extrusion head will be designated as station A; the first core pin will be designated as station B; and the first blow pin will be designated as station C; the second core pin will be designated as station D; and the second blow pin will be designated as station E.

In operation, successive parisons of essentially tubular thermoplastic material are intermittently downwardly extruded from a first station A. The halves 63 of the first preform mold are closed onto a parison 101 at station A, pinching shut one end of the parison while leaving the other end of the parison open and enclosing the parison within a preform mold cavity. The sections 65 of a first blow mold are essentially simultaneously closed around a previously formed thermoplastic preform 102 supported on a first core pin 41 at a second station B. Alternatively, blow mold sections 65 may be closed prior to closing sections 63 to provide time, if necessary, to withdraw the core pin before closing the preform mold. Since the preform mold sections are closed underneath the extrusion head, it is desirable to close them just prior to displacing the mold sections in order to avoid extruding onto the top of the mold sections. Nonsimultaneous closing would obviously require separate acutating means for the preform and blow mold sections.

The core pin 41 at station B is then retracted, leaving the previously formed preform 102 within a mold cavity in the first blow mold, as shown. The closed sections 63 of the first preform mold with enclosed parison 101 and the first blow mold with the enclosed previously formed preform 102 are then transferred to station B and station C, respectively. The first core pin 41 at station B is next inserted into the parison 101 in the preform mold at station B to compression mold the parison into a preform and to reduce the temperature of the preform by heat transfer from the preform to both the first core pin and to the first preform mold sections. At about the same time, the previously formed preform 102 in the first blow mold is expanded interiorly of the first blow mold by introduction of blow air from the first blow pin 53 at station C to form a blown thermoplastic article. A stretching operation as previously described may also be employed.

After a predetermined length of time adequate for the reduction of the temperature of the preform supported on the first core pin 41 at station B to a desired temperature, the sections 63 of the first preform mold and the sections 65 of the first blow mold are opened, leaving the preform on the first core pin at station B and the formed article on the blow pin at station C. The opened sections of the first preform mold and the first blow mold are then respectively transferred from stations B and C to stations A and B. The first preform mold and first blow mold are then closed upon another parison and upon the previously formed preform thereby beginning the repetition of the process for another iteration. Also, the neck sections 67 close around the neck of the previously formed article. The blow pin 53 may then be retracted, leaving the blown article supported by sections 67. When the molds are opened, the sections 67 will likewise open, being mounted on a common platen, to eject the article into a suitable position such as onto a conveyor or into a hopper.

While the preform and blow mold sections 63 and 65 are positioned at stations B and C, respectively, mold sections 64 and 66 are moved respectively from stations D and E to stations A and D. These molds are then closed. Sections 64 close on a subsequent parison at station A and sections 66 close around a previously formed preform supported on the core pin at station D. Then, the core pin at station D is retracted and the mold sections are moved from stations A and D back to stations D and E. Once moved, the core pin at station D is axially displaced for a compression molding a parison; at about the same time the blow pin and stretch rods at station E are axially displaced for the blow molding step.

Thus it will be realized that the same steps are preformed at stations D and E as are preformed at stations B and C, but the sequence is slightly out of phase, to accommodate the preform mold sections receiving parisons at the extruding station.

It will now be understood by those with skill in the art that more than two separate sets of molds can be or could be utilized, depending upon the cooling cycles.

The instant invention has been disclosed in connection with specific embodiments. However, it will be understood by those skilled in the art that variations of the illustrated embodiment may be undertaken without departing from the spirit and scope of the invention. For example, the neck cavity for the final embodiment could be eliminated entirely and the formed thermoplastic article could be allowed to drop into a sorting bin. Additionally, vent holes for applying a vacuum to the preform mold in the final embodiment could be added to facilitate the entry of the core pin into the parison. Additionally, the embodiment of FIG. 7 might also be modified to include a pair of extrusion heads and a pair of preform mold sections and blow mold sections on each separate platen. This likewise would require a pair of core pins at stations B and D and a pair of blow pins at stations C and E. These and other variations will be apparent to those skilled in the art and are within the spirit and scope of the invention.

What is claimed is:

1. An apparatus for forming a blown thermoplastic article, comprising:
   (a) means for extruding an essentially tubular parison of thermoplastic material;
   (b) a preform mold having sections which are closeable around the parison, thereby leaving at least one end of the parison open and enclosing the parison within a preform cavity;
   (c) means for radially expanding the parison with a differential pressure in order to enlarge the parison to essentially the shape of the preform mold, and holding the enlarged parison against the preform mold to accommodate the insertion of a core pin;
   (d) a tapering core pin insertable into the open end of the enlarged parison into essentially the entire length of the enlarged preform for compressing the parison between the core pin and the preform cavity to form a preform and for thermally conditioning the preform;
   (e) a blow mold having sections which are closeable around the thermally conditioned preform for enclosing the preform within a blow mold cavity; and
   (f) means for expanding the preform to the shape of the blow mold cavity.

2. Apparatus for forming blown thermoplastic articles, comprising:
   (a) means for extruding an upright tubular parison of thermoplastic material;
   (b) a preform mold having sections which are closeable around the parison, thereby leaving the lower end of the parison open and enclosing the parison within a preform cavity of tapered shape;
   (c) means for radially expanding the parison in order to enlarge the parison to essentially the shape of the preform mold, and holding the enlarged parison against the preform mold to accommodate the insertion of a core pin;
   (d) a tapering core pin insertable upwardly into the open end of the enlarged parison into essentially the entire length of the enlarged preform for compressing the parison between the core pin and the preform mold around the cavity to form a preform and for thermally conditioning the preform;
   (e) a blow mold having sections which are closeable around the thermally conditioned preform for enclosing the preform within a blow mold cavity such that the open end of the preform is at the lower end of the blow mold; and
   (f) means insertable into the open end of said preform for expanding the preform to the shape of the blow mold cavity.

3. The apparatus as defined in claim 2, further including means associated with the core pin for injecting air into the interior of the parison as the core pin is being inserted into the parison, in order to at least assist in expanding the parison.

* * * * *